United States Patent [19]

Lin

[11] Patent Number: 5,546,388

[45] Date of Patent: Aug. 13, 1996

[54] PACKET-SWITCHED FACSIMILE NETWORK AND METHOD OF OPERATION

[76] Inventor: Feng Lin, Blk 39, Upper Boon Keng Road, No. 12-2410, Singapore 1438, Singapore

[21] Appl. No.: 210,889

[22] Filed: Mar. 18, 1994

[51] Int. Cl.$^6$ .................................................. H04L 12/56
[52] U.S. Cl. ............................................. 370/60; 359/425
[58] Field of Search .......................... 370/94.1, 60, 60.1, 370/61; 178/3; 358/425, 407, 435, 436, 437, 438, 434, 442, 400, 407, 430, 428, 431; 395/425, 275, 842, 821; 379/58

[56] References Cited

U.S. PATENT DOCUMENTS

| Re. 31,182 | 3/1983 | Crager et al. ................................. 178/3 |
| 4,058,672 | 11/1977 | Crager et al. ................................. 178/3 |
| 4,058,838 | 11/1977 | Crager et al. ................................. 358/425 |
| 4,130,885 | 12/1978 | Dennis ................................. 395/425 |
| 4,392,222 | 7/1983 | Ando ................................. 370/60 |
| 4,754,428 | 6/1988 | Schultz et al. ................................. 395/275 |
| 4,841,373 | 6/1989 | Asami et al. ................................. 358/425 |
| 4,975,771 | 12/1990 | Kamath ................................. 370/118 |
| 5,014,300 | 5/1991 | Harvath et al. ................................. 379/100 |
| 5,042,028 | 8/1991 | Ogawa ................................. 370/58.2 |
| 5,045,953 | 9/1991 | Kotani et al. ................................. 358/431 |
| 5,223,968 | 6/1993 | Stringer et al. ................................. 370/60 |
| 5,282,238 | 1/1994 | Berland ................................. 379/58 |
| 5,311,345 | 5/1994 | Cloonan et al. ................................. 370/60 |

FOREIGN PATENT DOCUMENTS

WO93/
12608A  6/1993  WIPO.

OTHER PUBLICATIONS

International Search Report for PCT application corresponding to the present patent application (PCT/SG95/00003, mailed on Jun. 30, 1995.

CCITT X.5–Facsimile Packet Assembly/Disassembly Facility (FPAD) in a Public Data Network (1992).
CCITT X.38–G3 Facsimile Equipment/DCE Interface for G3 Facsimile Equipment Accessing the Facsimile Packet Assembly/Disassembly Facility (FPAD) in a Public Data Network Situated in the Same Country. (1992).
CCITT X.39–Procedures for the Exchange of Control Information and User Data Between a Facsimile Packet Assembly/Disassembly (FPAD) Facility and a Packet Mode Data Terminal Equipment (DTE) or another FPAD. (1992).

*Primary Examiner*—Douglas W. Olms
*Assistant Examiner*—Dang Ton
*Attorney, Agent, or Firm*—Samuel A. Kassatly; Frazzini & Kassatly

[57] ABSTRACT

A packet-switched facsimile network and method of operation, wherein the network includes a plurality of facsimile stations, and a plurality of nodes for connecting the facsimile stations. The network includes subscribers' transmission channels, such as telephone switched network, for connection to the facsimile stations, and common transmission channels, such as dedicated lines and packet switched network, for connection to the nodes, in order to allow the facsimile stations to communicate with each other. In operation, the part of image data received from a plurality of facsimile stations is formed into data packets at the nodes. Simultaneously, the formed data packets are sent via the common transmission channels to destination nodes, and therefrom to appropriate receiving facsimile stations. It is possible that during transmission, the destination node may transmit image data contained in one data packet, while it has not received the next data packet that contains image data to be sent subsequently, which could cause transmission error. As a result, the destination node selectively inserts fill codes into the image data. In the preferred embodiment, the facsimile network is a packet switching Group 3 facsimile network and the G3 machines can communicate with each other point-to-point, via the packet-switched facsimile network.

32 Claims, 12 Drawing Sheets

PACKET-SWITCHED FACSIMILE NETWORK AND METHOD OF OPERATION

BACKGROUND OF THE INVENTION

1. Field of the Invention

The present invention relates in general to the field of data communications, and it more specifically relates to a packet-switched facsimile network and method of operation, with optimal utilization of network capability and point to point facsimile communication service.

2. Background Art

Digital facsimile machines using digital networks as transmission means are now increasingly being developed and implemented. Some of these facsimile machines use packet switched networks, as described in the following U.S. patents: Crager et al. U.S. Pat. No. 4,058,672; Crager et al. U.S. Pat. No. Re. 31,182; Crager et al. U.S. Pat. No. 4,058,838; Dennis U.S. Pat. No. 4,130,885; Ando U.S. Pat. No. 4,392,222; Asami et al. U.S. Pat. No. 4,841,373; and Ogawa U.S. Pat. No. 5,042,028.

Other facsimile machines use storage and forward communications techniques, as illustrated in the following U.S. patents: Crager et al. U.S. Pat. No. 4,058,672; Crager et al. U.S. Pat. No. Re. 31,182; Crager et al. U.S. Pat. No. 4,058,838; and Harvath et al. U.S. Pat. No. 5,014,300. U.S. Pat. No. 4,754,428 to Schultz et al. describes a printer protocol, which can be used in facsimile machines. All the foregoing references are incorporated herein by reference.

Other more conventional methods use point-to-point facsimile communication, where a facsimile machine transmits image data to another facsimile machine via a public telephone switching network. These methods of communications can be quite costly. In a storage and forward facsimile communications system a source or originating facsimile machine transmits image data to a first node, which, in turn, transmits the data to a second node, via dedicated lines or a packet switched network. The second node then transmits the image data to a destination or receiving facsimile machine. The use of the storage and forward communication system can be more economical than point-to-point communication. However, when the source facsimile machine finishes transmitting the image data, the destination facsimile machine will not have received the image data, which is still in the node systems.

In a packet switching communications system, a source facsimile machine, such as a Group 3 facsimile machine, can transmit image data to a destination facsimile machine, such as another Group 3 receiving facsimile machine via a packet switching network. The source facsimile machine transmits image data signals to a packet assembler/disassembler (PAD), which divides the signals into packets, and transmits these packets to a second PAD, via a packet switched network. The second PAD restores the image data signals from the packets, and transmits them to the destination facsimile machine. However, because of the difference in the transmission times of the various packets in the packet switching network, it is possible that the PAD transmits the image data signals from a packet to the destination facsimile machine, without receiving the next packet containing image data signals to be transmitted. This can interrupt the communication between the source and the destination facsimile machines, resulting in a transmission error.

As used herein, the terms "packet switching" and "packet switched" are interchangeable, and refer to a method of transferring data across a network. It divides data into segments, each of which is wrapped in an envelope to form a packet. A typical message comprises one or more packets. Each packet contains the actual user data plus information helpful to its movement across the network, such as addressing, sequencing and error control.

Packet switching is a subset of the traditional message switching (storage and forward), in which data is transmitted in blocks, stored by the first switching node it meets in the network and forwarded to the next and subsequent nodes, until it reaches the destination. No single user or large data block can tie up the circuit or node resources indefinitely.

One of the most important measure of packet switching performance is that of delay. Delay is defined for several different contexts. Cross-network delay is the amount of time a packet takes from the time it enters the network until the time it leaves the network. Such delays are typically in the hundreds of milliseconds.

The fastest rate that scanning lines can be sent to a receiving facsimile unit is determined by the minimum scan line time (MSLT), the time taken by the receiving facsimile unit to print a scan line. The standard MSLT is 20 ms, but it can range from 0 to 40 ms/line depending on the facsimile equipment design. The facsimile transmitter obtains this information from the receiver during handshake (generally in the DIS signal) and does not send faster, but often sends slower.

The actual sending time depends on the number of coded bits per line and the modem speed. The number of coded bits is determined by the amount of black and white information. MR coding gives fewer bits than MH coding. The modem speed is set during handshake. If a coded line at the transmitter is ready, the sending must be delayed by adding fill bits, a string of zeros, which are deleted at the receiver.

Therefore, there is a need for a new facsimile network including a node system, which addresses the concerns of conventional facsimile networks, and which provides adequate solutions and improvement thereto.

SUMMARY OF THE INVENTION

It is an object of the present invention to provide a new packet-switching facsimile network and a method of operation, for optimizing the utilization of the network capability and for providing the point to point facsimile communication service.

It is another object of the present invention to provide a facsimile communications network with almost "simultaneous" transmission and reception of the image data, similar Go conventional point-to-point facsimile communication. As used herein, the term "simultaneously" includes an appropriate and acceptable delay, which is generally in the range of hundreds of milliseconds to seconds.

It is yet another object of the present invention to provide a packet switching Group 3 facsimile network, in which the facsimile stations operating in accordance with the CCITT Group 3 standard can communicate with each other in a point to point communication fashion.

Briefly, the foregoing and further objects are achieved by providing a new packet-switched facsimile network and method of operation, wherein the facsimile network includes a plurality of source facsimile stations, a plurality of destination facsimile stations, and a plurality of node systems for connecting the facsimile stations.

The network includes subscribers' transmission channels, such as telephone switching network, exchange lines, direct distance dialing lines or private lease lines, for connection to the facsimile stations, and common transmission channels, such as digital circuits via satellite, optical fiber (submarine) cable and digitized analogue cable, packet switched network and ISDN network, for connection to the node systems, in order to allow the facsimile stations to communicate with each other.

In the packet switched facsimile network of the present invention, the method of transmitting the image data from a source facsimile station to a destination facsimile station includes the following steps A, B, C and D simultaneously: In step A, the source facsimile station transmits image data to a node system. In step B, each time the source node system receives a part of image data from the source facsimile station, it repeats the following substeps B1 and step B2:

In sub-step B1, the source node system generally generates a data packet. If only a part of the image data is received, then the image data is divided into two data packets, which are sequentially transmitted. In order to reduce transmission delay, it would be preferable to send the first portion of the image data, rather than wait for the second portion to arrive and then transmit the entire image data. In sub-step B2, the source node system generally simultaneously transmits the data packet over the network to the destination node system.

In step C, each time the destination node system receives a data packet which includes a part of the image data from the source facsimile station, it repeats the following sub-steps C1, C2 and C3. In sub-step C1, the destination node system reconstructs a part of image data. In sub-step C2, it generally simultaneously (after transmitting the reconstructed image data), transmits the part of the reconstructed image data to the destination facsimile station. In sub-step C3, the destination node system selectively inserts and transmits fill codes along with the transmitted reconstructed image data.

In step D, the destination facsimile station deletes the fill codes and reproduces the received image data. After the destination node system transmits the last part of the image data and fill codes, the destination facsimile station reproduces the entire image data.

The simultaneous transmission of image data to the destination facsimile stations includes the simultaneous reception by each source node system of image data from a plurality of source facsimile stations, and the generation of a plurality of packets therefrom, each of which includes a part of the image data from some source facsimile station. In order to transmit each packet to the destination node system with minimum delay and maximum utilization of the transmission channels, the packets are multiplexed and transmitted over common transmission channels to the destination node systems, and thereafter to the destination facsimile stations. Additionally, the terms "simultaneously" or "generally simultaneously" include the event where the destination node system receives a data packet, but the destination node system has not finished transmitting the image data of the last data packets, and further include the event where the destination node system receives a next data packet before the prior data packet is received, for instance, the destination node system receives data packet (n) before data packet (n–1), because of the different transmission times of data packets in the packet switched network.

The operation of the packet switching facsimile network further includes processing and transmitting facsimile handshake signals in packet form between the facsimile stations. With the simultaneous transmission of image data and handshake signals between the source and destination facsimile stations, the packet switching facsimile network provides the point to point facsimile service.

In the preferred embodiment, the packet switching facsimile network is a packet switching Group 3 facsimile network, with the facsimile stations operating in accordance with CCITT Group 3 standard, and the facsimile stations can communicate with each other in a point to point way, via the network.

DETAILED DESCRIPTION OF THE PREFERRED EMBODIMENT

Figure 1:
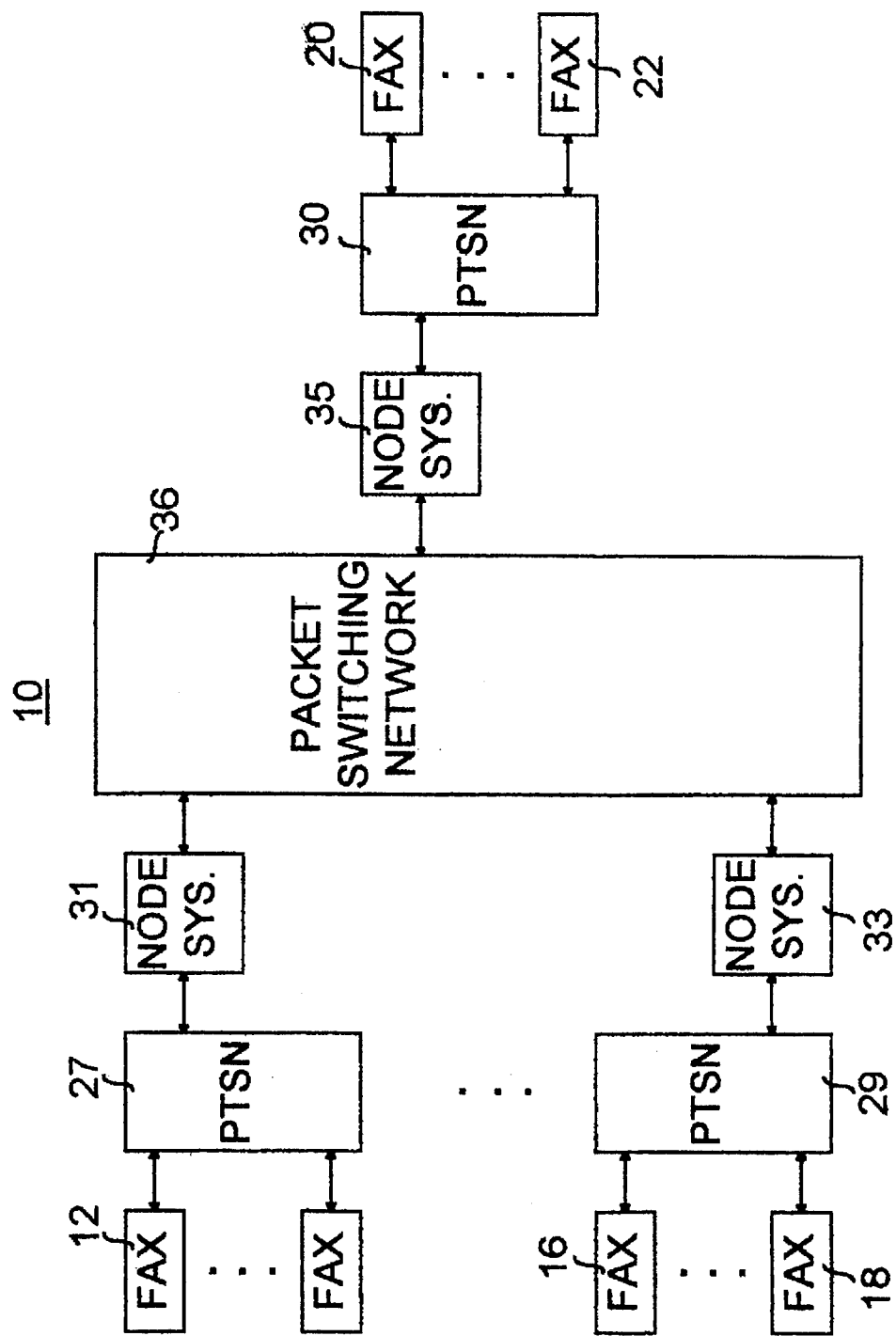
FIG. 1 is a schematic block diagram of a facsimile communications network according to the present invention.

Referring now to the drawings, and more particularly to FIG. 1 thereof, there is illustrated a block diagram of a facsimile communications network 10 according to the present invention. The network 10 includes a plurality of remotely located facsimile stations or machines, such as the facsimile machines 12, 14, 16, 18, 20 and 22. While only six facsimile machines are illustrated, it should be understood to those skilled in the art, after reviewing the present specification, that several other facsimile machines can be used in conjunction with the inventive communications network 10. The facsimile machines are Group 3 machines which operate in accordance with CCITT Group 3 standard (i.e., such as Sharp models FO 120, FO 130 facsimile machines manufactured by Sharp, or RICOH 220, 240 facsimile machines manufactured by RICOH), or other types of data communications devices. It is anticipated that progenies of the Group 3 facsimile machines might be able to use the concept of the present invention.

The network 10 further includes a plurality of local public telephone switching networks (PTSN) 27, 29, 30 for connection to the facsimile machines 12 through 22. It should however be understood that, while only three PTSN's are illustrated, the network 10 can accommodate several other PTSN's. A plurality of node systems 31, 33, 35 are connected between the PTSN's 27, 29, 30 and a packet switching network (PSN) 36, such that, at the same time, the facsimile machines 12 through 22 can intercommunicate, via the node system 31, 33, 35 and the packet switching network 36.

The node system 31, 33, 35 could become part of the telephone system, it would be convenient for providing another economical transmission channel, with the same communication effect, for the facsimile image data transmitted using the public long distance telephone network. Additionally, it would be convenient for setting up a simple access method for the service and for managing the communication fare.

When the node system receives image data from a source facsimile station, it is referred to as a source node system of the facsimile station. Similarly, when the node system transmits image data to a destination facsimile station, it is referred to as a destination node system. In general, in the preferred embodiment, the node system is a "two way" node system, and is capable to simultaneously (i.e., at the same time) receive image data from a plurality of facsimile stations, and transmitting image data to a plurality of other facsimile stations.

Figure 2A:
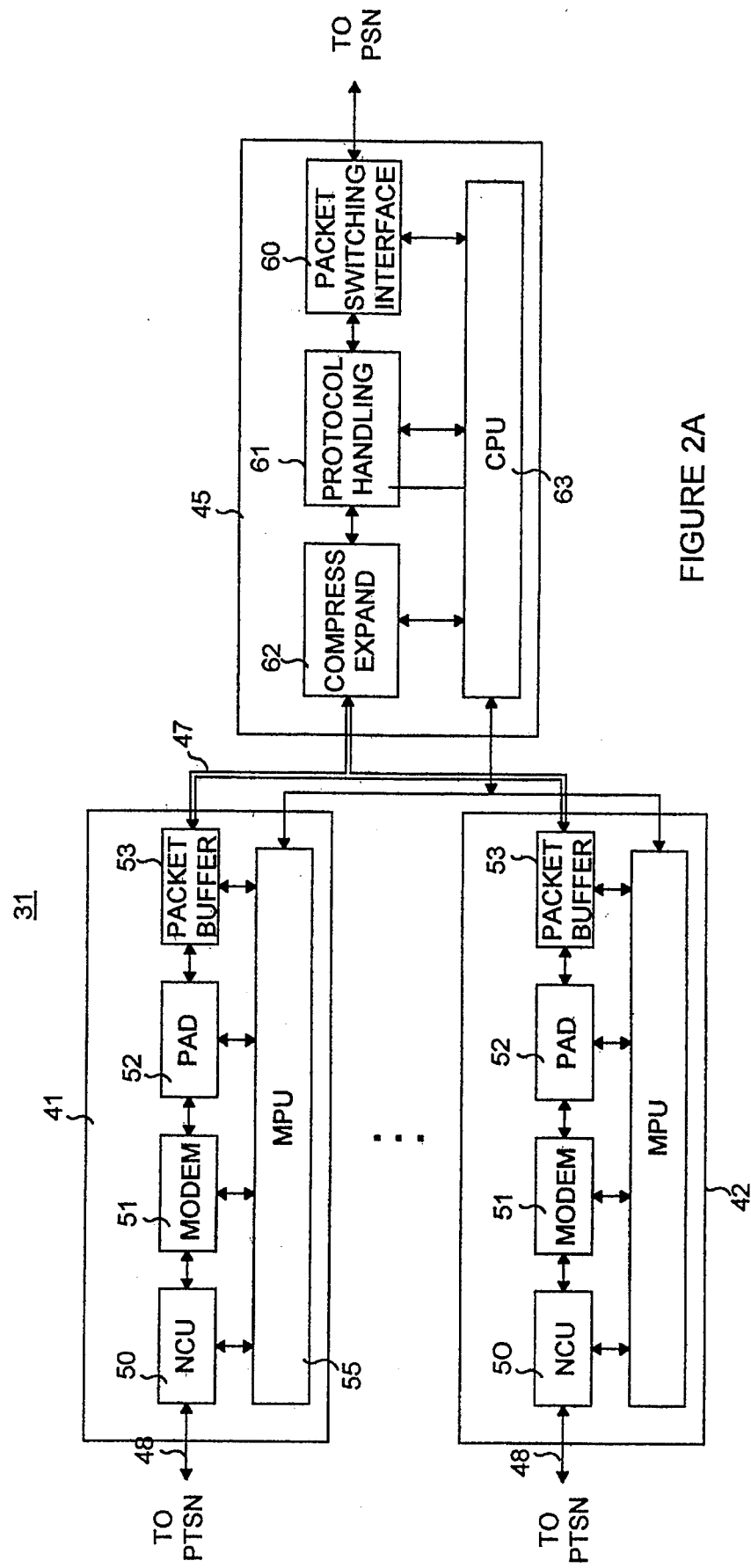
FIG. 2a is a schematic block diagram of an exemplary source node system employed in the facsimile communications network of FIG. 1.

FIG. 2a illustrates an exemplary source node system, such as the node system 31. All the node systems have substantially similar functions and designs, and therefore only the node system 31 will hereinafter be described in greater detail. The node system 31 includes a plurality of generally similar facsimile units 41, 42 which are adaptable for communication with the facsimile machines 12, 14 via the PTSN 27. While only two facsimile units 41, 42 are illustrated, the node system 31 can accommodate a greater number of facsimile units.

A packet communication unit 45 is connected to the facsimile units 41, 42 of the node system 31, and communicates with the other node systems (i.e., 33, 35), via the packet switching network 36. A data bus line 47 connects the facsimile units 41, 42 of the node system 31 to the packet communication unit 45, for enabling the exchange of packets between the facsimile units 41, 42 and the packet communication unit 45. Each facsimile unit (i.e., 41) can transmit image data to, and receive image data from one facsimile machine (i.e., 12), via the PTSN 27. All the facsimile machines 12 through 22 are capable of simultaneously communicating between each other via the packet switching network 36 at the same time.

Each facsimile unit (i.e., 41) includes a network control unit (NCU) 50 which is connected to the PTSN 27, via an appropriate communications link 48, such as a telephone or cable link. The NCU 50 is connected to a modem 51, which modulates and demodulates the image data to be transmitted or received. The modem 51 is, in turn, connected to a packet assembler/disassembler (PAD), which converts the received image data into data packets, and converts the received data packets into image data.

The PAD 52 is connected to a packet buffer 53 which stores the image data that have been received gradually by the facsimile unit 41, but have not been formed in a packet and sent to the other node systems. The NCU 50, the modem 51, the PAD 52 and the packet buffer 53 are controlled by a micro-processor (MPU) 55.

The packet communication unit 45 includes a packet switching interface 60 which controls the connection of the node system 31 to the packet switching network 36. The packet switching interface 60 is connected to a protocol handling section 61, which provides a communication protocol to the packets to be transmitted into the PSN 36. The protocol handling section 61, is in turn connected to a compressor/expander 62, which compresses the data packets to be transmitted and expands the data packets to be received. The packet switching interface 60, the protocol handling section 61 and the compressor/expander 62 are controlled by a central processor (CPU) 63 (see also FIG. 2b), which also controls the MPU 55 in the facsimile units 41, 42 of the node system 31. The data bus line 47 connects the packet buffers 53 in the facsimile units 41, 42 to the compressor/expander 62, and allows the data packets to be exchanged between the facsimile units 41, 42 and the packet communication unit 45.

In operation, the node system 31 receives the image data from one or more source facsimile machines 12 through 14, and transmits corresponding data packets to one or more destination or receiving node systems 33, 35, via the packet switching network 36. Each one of the source facsimile machines 12 through 14 can transmit image data to one facsimile unit 41, or 42 of the node system 31.

The modem 51 demodulates the image data and sends it to the PAD 52, which stores it in the buffer 53. Each time the PAD 52 receives part of the image data, such as image data received in the period of 0.1 second or 1 second, (if the facsimile machine operates at 9600 bps (bits per second) speed, the part of the image data is 960 bits in 0.1 second, and 9600 bits in 1 second,) these image data received gradually in the period of 0.1 second or 1 second are stored in the buffer 53 before they are transmitted to other node systems as a packet, PAD 52 processes the part of image data, and forms a corresponding data packet which includes the image data, address (or addresses) data identifying the destinations for which the packet is intended, and the order of reassembly of the packet in the image data from which the packet was subdivided. The PAD 52 then sends the data packet to the packet buffer 53 to be queued and to await transmission. It is possible to use a common buffer and to reduce the number of buffers 53 in each facsimile unit 41, 42. It is also possible to use a common PAD to replace PAD 52 in each facsimile unit 41, 42.

Thereafter, each of the data packets in the packet buffers 53 is, independently, one by one, sent to the compressor/expander 62, which compresses the data packets and sends them to the protocol handling section 61. The protocol handling section 61 adds the communication protocol and the appropriate address (or addresses) data of the destination node systems to the data packet.

The data packet is then transmitted to the packet switching network 36, via the packet switching interface 60. The packet switching network, in packet multiplex manner, routes and transmits each of the data packets to the appropriate destination node systems (i.e., 33, 35), pursuant to the address (or addresses) data of the destination node systems in the data packet.

The destination or receiving node system, i.e., 35, receives the transmitted data packets from the packet switching network 36, restores the corresponding image data from the data packets, and transmits the image data to the destination facsimile machines 20 through 22. The following is a more detailed description, where similar reference numbers refer to similar or like components.

Figure 2B:
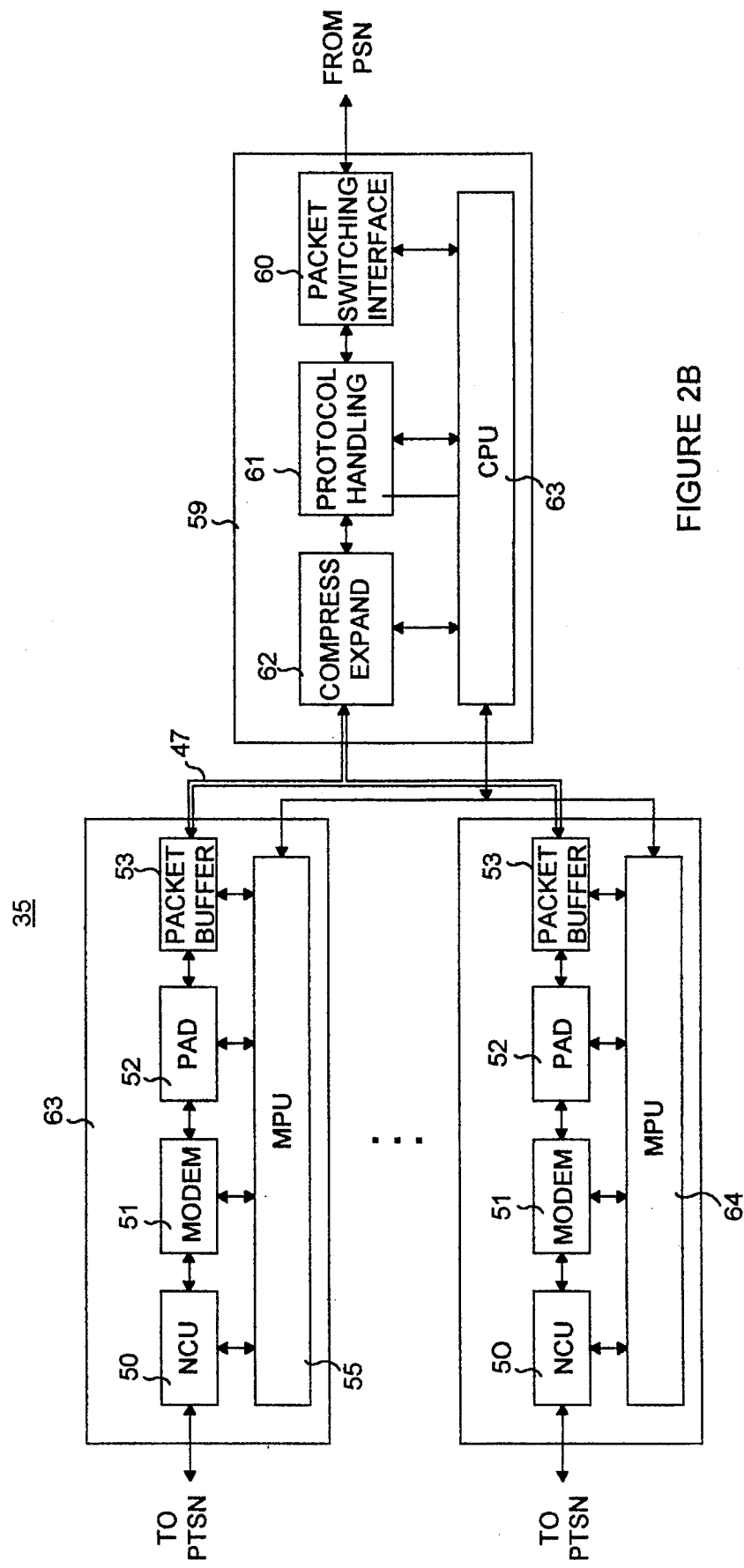
FIG. 2b is a schematic block diagram of an exemplary destination node system employed in the facsimile communications network of FIG. 1.

FIG. 2b illustrates an exemplary destination node system 35, which receives the data packets, via the packet switching interface 60 of the packet communication unit 59, from the packet switching network 36. Each data packet is then sent to the protocol handling section 61, and thereafter to the compressor/expander 62, which expands the data packet. The data packet is then sent to the packet buffer 53 of one or more destination facsimile units, such as the facsimile units 63 and 64 of the node system 35, according to the address (or addresses) data of the destination facsimile machines in the data packet.

In each destination facsimile unit, the data packet is sent to the PAD 52, which converts the data packet into image data, and then to the modem 51, which modulates the image data and transmits the modulated image data to a corresponding destination facsimile machines 20 or 22, via the NCU 50 and the PTSN 30. If the entire image data of a data packet is transmitted, but the next data packet has not been received by the node system 35, and no image data is sent to the destination facsimile machine, this may result in transmission interruption or transmission error. Consequently, in order to resolve this problem, the facsimile unit 63 causes fill codes to be inserted between the image data, as illustrated in FIGS. 3b and 3b.

Figure 3A:
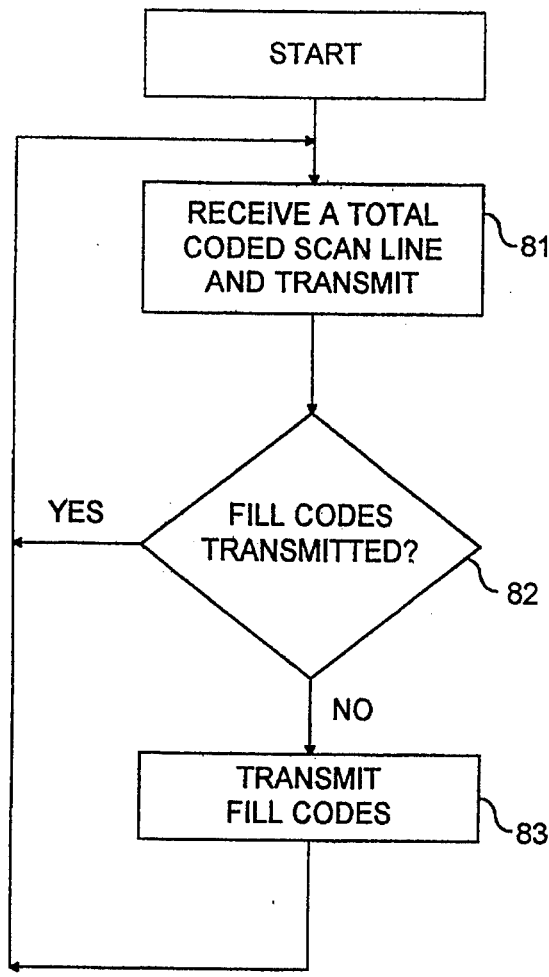
FIG. 3a is a flow chart diagram illustrating the process of inserting fill codes within image data, by a facsimile unit employed in the destination node system of FIGS. 2b.
Figure 3B:
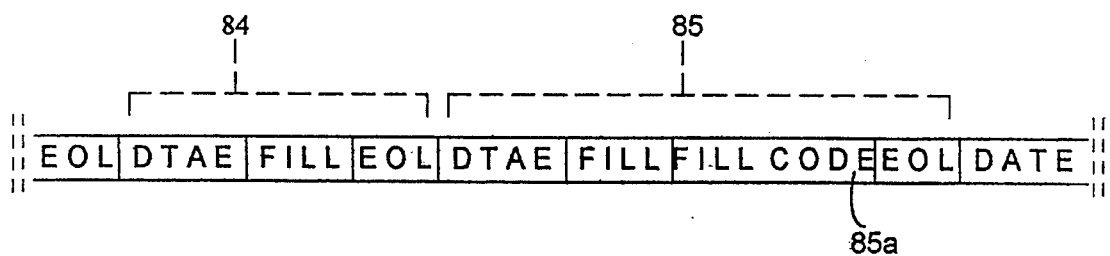
FIG. 3b is a diagram showing the position of the fill codes inserted according by the process of FIG. 3a, within the image data.

FIG. 3b is a flow chart diagram which illustrates part of the operation of a facsimile unit 63 employed in the node systems, such as the node system 35, for converting data packets into image data and for inserting fill codes between the image data. FIG. 3b is a diagram showing the position of the fill codes in the image data after the fill code insertion operation;

As shown by the process block 81, the PAD 52 receives a total coded scan line from the packet buffer 53. (In CCITT Group 3 standard, image data is made up by a plurality of total coded scan lines). A CCITT Group 3 standard total coded scan line 84 includes data bits, required fill bits (a string of 0's) and EOL bits (end of line). Then, the PAD 52 sends data bits and required fill bits except the EOL bits of the total coded scan line to the modem 51, for subsequent transmission to the NCU 50.

The facsimile unit 63 then starts the code filling process. At the decision block 82, the MPU 55 in the facsimile unit 63 determines whether the fill codes, to be inserted in the remaining image data at the packet buffer 53 if necessary, would be transmitted for a certain period of time, such as a few of seconds, (i.e., could provide enough delay time). An exemplary fill codes includes a string of 0's. A few of total coded scan lines at the buffer 53 are enough for the purpose. The period of time ensures that, after the wait, the node system 35 should receive the next data packet. The next data packet includes the following image data to be sent to the destination facsimile machine.

If the fill codes are able to provide sufficient delay, the PAD 52 transmits EOL bits, returns to block 81 and continues to send the next total coded scan line 84. If the fill codes are unable to provide sufficient delay, the PAD 52 proceeds to the process block 83, for generating fill codes 85a, a string of 0's, and transmits it after the bits sent by the process block 81. The total coded scan line 85 shows the insertion position of the fill code 85a in the image data.

The PAD 52 discontinues the insertion of the fill codes 85a if the packet buffer 53 receives the next data packet, or if the transmission time of the data bits and fill codes reaches the time limit (i.e., 3 seconds) as defined by CCITT Group 3 standard. In which case, the fill codes are inserted in the next total coded scan line again. The PAD 52 then transmits the EOL bits and returns to the process block 81, and proceeds with the transmission of the next total coded scan line 84 or 85.

A total coded scan line 85 with fill codes 85a produces the same copy result in the destination facsimile machines 20, 22 as a standard total coded scan line 84. However, it takes a longer time to transmit the total coded scan line 85, which provides a waiting time to receive the next data packet and at the same time keeps the communication between the node system 35 and the destination facsimile machine 20, 22.

Figure 4A:
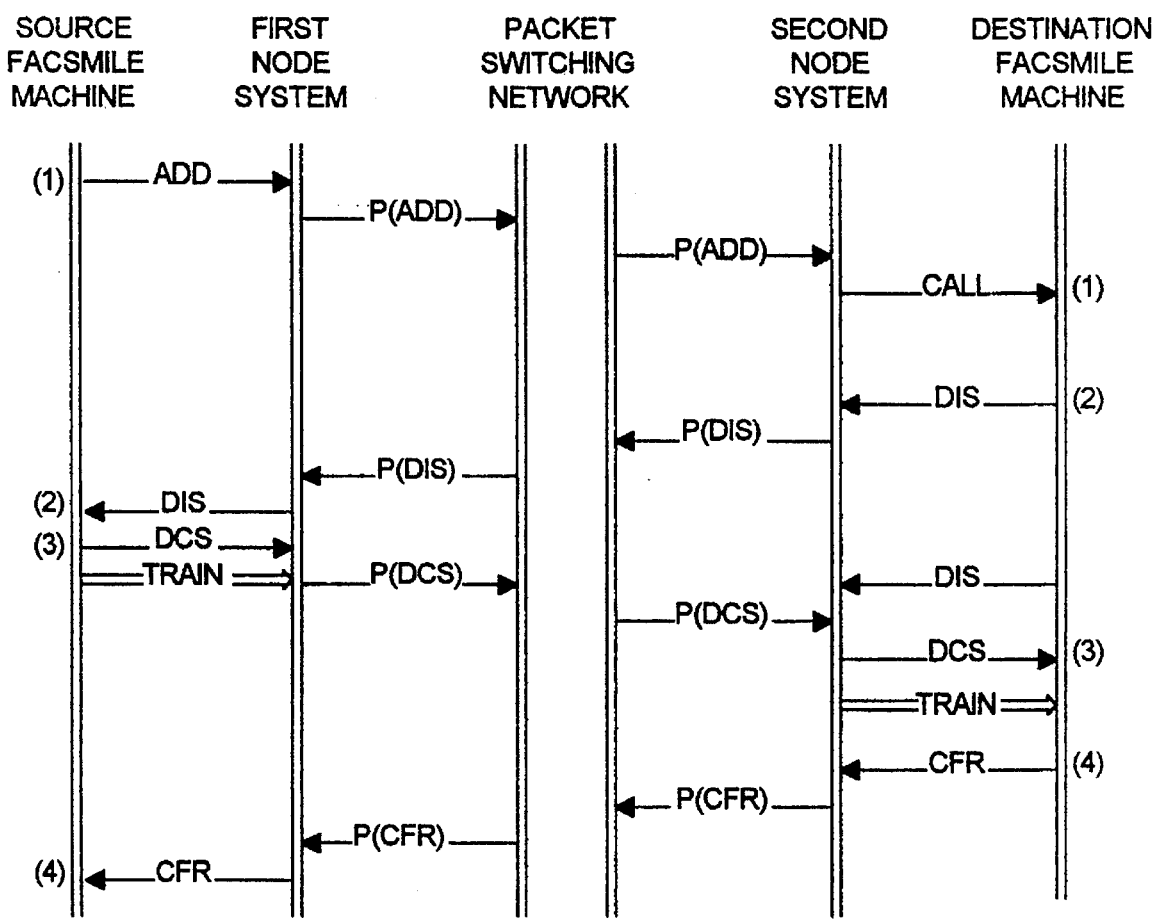
FIGS. 4a, 4b and 4c are exemplary time diagrams or protocols, illustrating a communication method between a source facsimile machine or station and a destination facsimile machine or station, via the facsimile communications network of FIG. 1.
Figure 4B:
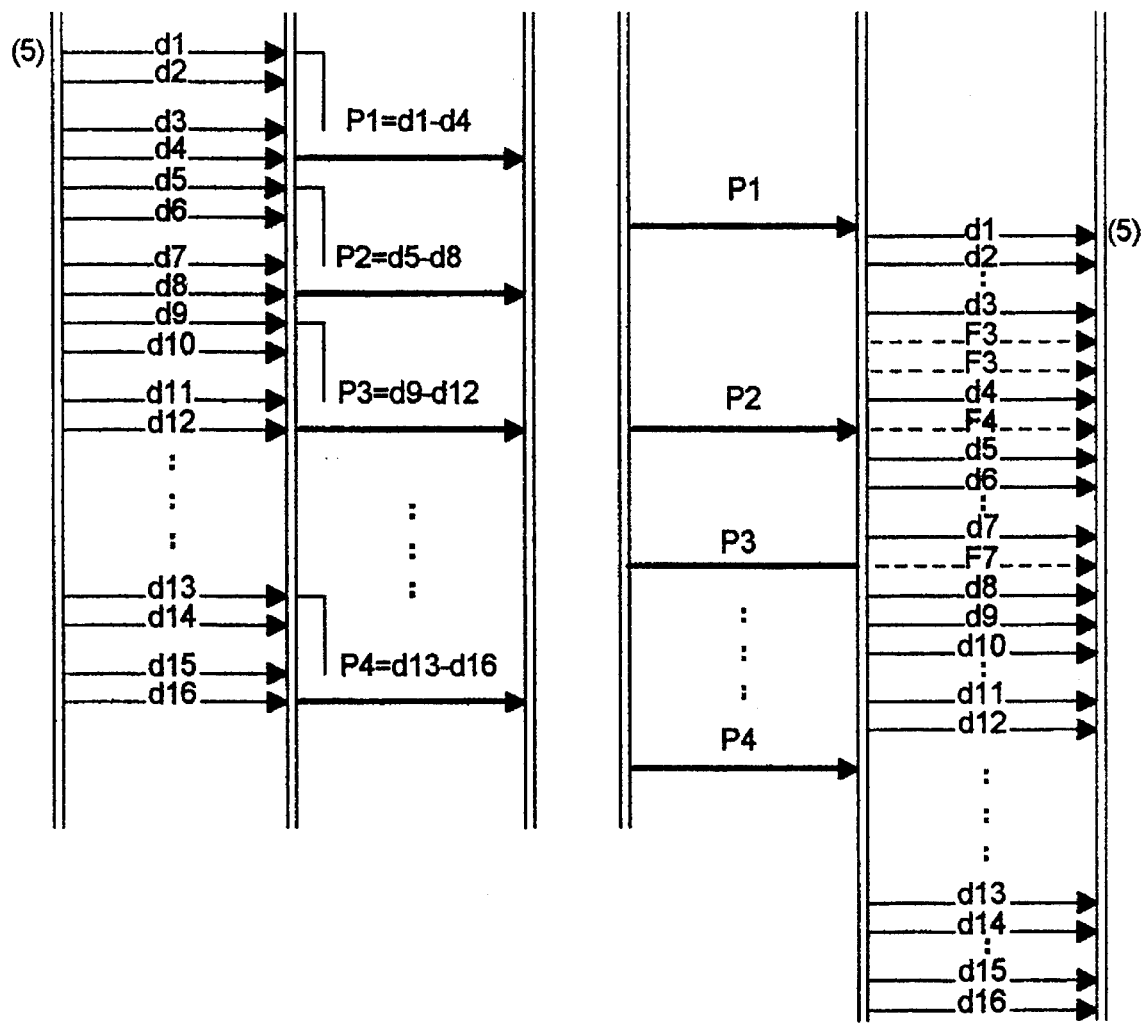
Figure 4C:
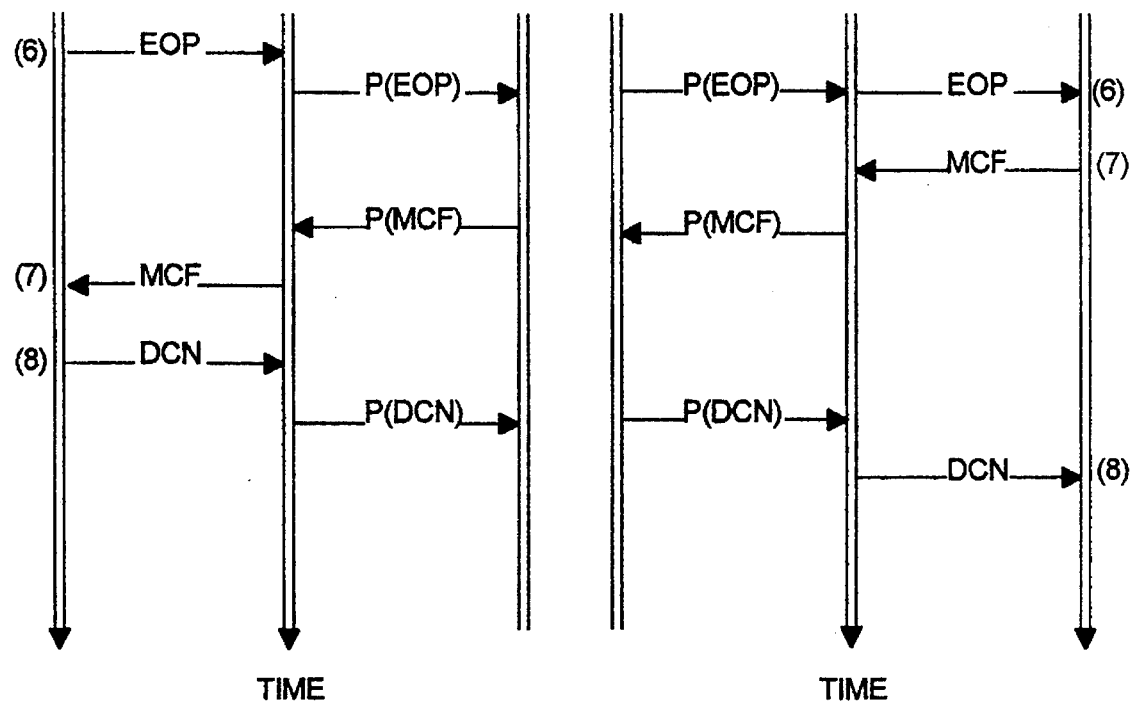

Referring now to FIGS. 4a, 4b and 4c, they represent exemplary time lines, diagrams or protocols for a communication method between the source facsimile machine or station, i.e., 12, and the destination facsimile machine or station, i.e., 22, using the facsimile communications network 10. In this example, the facsimile machines operate in accordance with CCITT Group 3 standard. The time lines (1—1), (2—2), (3—3) and (4—4) of FIG. 4a will now be described.

Starting with time line (1—1), the source facsimile machine 12 places a call to a first local node system 31, via the local PTSN 27. Once the connection with one of the facsimile units, i.e., 41, of the first node system 31, is established, the address of the destination facsimile machine, i.e., 22, is sent to the first node system 31, which forms a corresponding data packet P(ADD).

The first node system 31 then sends the data packet P(ADD) to a second node system, i.e., 35, associated with the destination facsimile machine 22, via the packet switching network 36. Thereafter, the second node system 35, through one of its free facsimile units, i.e., 63, calls the destination facsimile machine 22, and establishes a connection therewith.

The time line (2—2) will now be described. The destination facsimile machine 22 sends a DIS (Digital Identification Signal) to the second node system 35. After receiving the DIS, the second node system 35 processes it and forms a corresponding data packet P(DIS), which contains the DIS data, and sends it to the first node system 31, via the packet switching network 36. The first node system 31 restores the DIS from the data packet P(DIS), and sends it to the source facsimile machine 12.

The time line (3—3) will now be described. In response to the DIS signal, the source facsimile machine 12 transmits a DCS (Digital Command Signal) signal and a Train signal to the first node system 31. After receiving the DCS signal, the first node system 31 forms a corresponding data packet P(DCS) therefrom, and sends it to the second node system 35.

The first node system 31 receives the Train signal to test the quality of the transmission line between the source facsimile machine 12 and the first node system 31. After receiving the P(DCS) packet, the second node system 35 restores the DCS signal and sends it to the destination facsimile machine 22. The second node system 35 also reads the Train signal data from the DCS signal, generates a similar Train signal, and sends the latter Train signal to the destination facsimile machine 22, for testing the quality of the transmission line between the second node system 35 and the destination facsimile machine 22.

The time line (4—4) will now be described. In response to the DCS and the Train signal, the destination facsimile machine 22 sends a CFR (Confirmation to Receive) signal to the source facsimile machine 12, via the second node system 35, the packet switching network 36 and the first node system 31.

Referring to FIG. 4b, the time line (5—5) will now be described. The time line (5—5) illustrates the transmission method of the image data from the source facsimile machine 12 to the destination facsimile machine 22. In response to the CFR signal, the source facsimile machine 12 starts to continuously transmit image data to the first node system 31, until all the image data, for example d1 through d16 forming the document to be faxed, are transmitted.

At the same time, the first node system 31 receives the image data continuously. Every time the first node system 31 receives a part of image data such as image data received in one second, it processes the part of image data, forms a corresponding data packet therefrom which includes the image data, and transmits the data packet to the second node system 35, via the packet switching network 36. For example, the first node system 31 sequentially transmits the packets, one at a time. It begins by transmitting a first data packet P1 which contains, and corresponds to the image data d1–d4. Then, it transmits a second data packet P2 which contains, and corresponds to the image data d5–d8; a third data packet P3 which contains, and corresponds to the image data d9–d12; and finally, it transmits a fourth data packet P4 which contains, and corresponds to the image data d13–d16.

After receiving the first data packet P1, the second node system 35 transmits the corresponding image data d1, d2, d3 to the destination facsimile machine 22. When it sends the image data d3, and it has not received the next data packet P2, it inserts fill codes F3 after the image data d3, and fill codes F4 after the image data d4. If, while the second node system 35 is transmitting the fill codes F4, it receives the next packet P2, it stops sending the fill codes F4, and continues to send the image data d5, d6, d7.

If, when the second node system 35 sends the image data d7, it has not received the next data packet P3, it inserts the fill codes F7 after the image data d7. If, while the second node system 35 is transmitting the fill codes F7, it receives the next data packet P3, it stops sending the fill codes F7, and continues to send the remaining image data d8 through d12. Following the same method, the second node system 35 transmits the image data d1–d16 to the destination facsimile machine 22.

The present example uses fill codes (000 . . . 0), as defined by the CCITT Group 3 standard. The fill codes ensure that the destination facsimile machine 22 does not interrupt the reception. In the present embodiment, if the second node system 35 receives the first data packet P1, and delays the transmission of the image data for a certain period of time, the second node system 35 will not include fill codes during the transmission of all the image data, since this delay would be presumed to have provided a sufficient waiting period for receiving subsequent data packets.

The time lines (6—6), (7—7) and (8—8) will now be described in relation to FIG. 4c. As illustrated by the time line (6—6), the source facsimile machine 12 sends an EOP (End of Procedure) signal to the first node system 31, after transmitting the image data d1–d16. The first node system 31 forms a corresponding data packet P(EOP), and sends it to the second node system 35, which restores the EOP signal and sends it to the destination facsimile machine 22.

Referring now to the time line (7—7), the destination facsimile machine 22, in turn, sends an MCF (Message confirmation) signal to the second node system 35, which forms a corresponding data packet P(MCF), and sends it to the first node system 31, which restores the MCF signal and sends it to the source facsimile machine 12.

As illustrated by the time line (8—8), the source facsimile machine 12 sends a DCN (Disconnect) signal to the first node system 31, which forms a corresponding data packet P(DCN), and sends it to the second node system 35, which restores the DCN signal and sends it to the destination facsimile machine 22.

Some of the facsimile signals which are restored from the data packets and sent to the facsimile machines 12 and 22, by the node systems 31, 35 also include other information from these node systems 31, 35, such as the CFR signal, which includes the test result of the transmission lines between the source or destination facsimile machines 12, 22 and the first and second node systems 31, 35.

Figure 5:
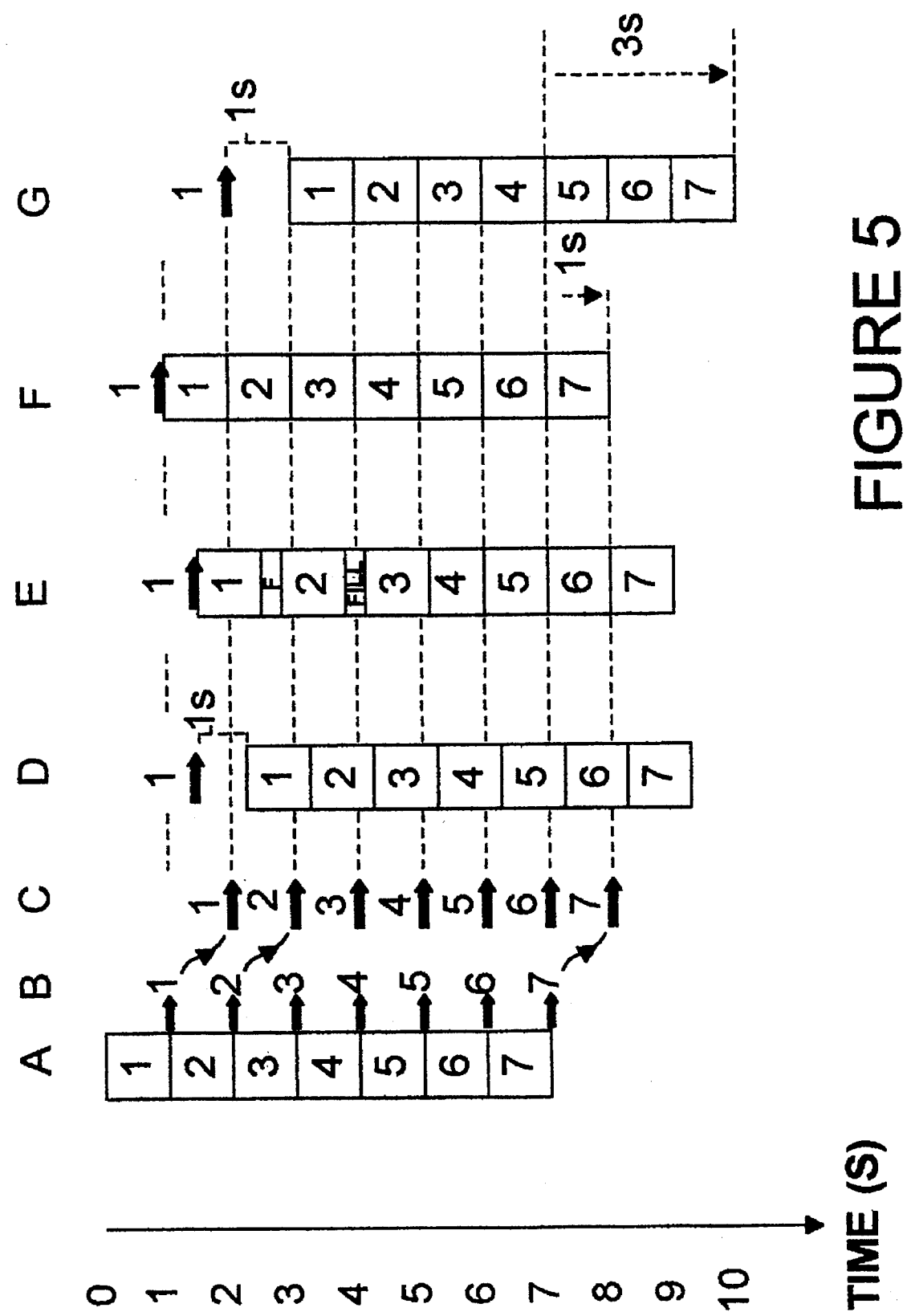
FIG. 5 is a exemplary time diagram illustrating the time difference between the image data transmitted from the source facsimile stations, and the image data received by the destination facsimile stations, using the facsimile communication network of FIG. 1.

Referring now to FIG. 5, it is an exemplary diagram illustrating the time difference between the image data transmitted from the source facsimile machine 12 and the image data received by the destination facsimile machine 22, using the packet switching facsimile network 10 of FIG. 1. Each block in FIG. 5 represents the image data transmitted or received in one second.

Column A shows the image data transmitted by the source facsimile machine 12 and received by the first node system 31. Column B shows that each time the first node system 31 receives image data for one second, it forms a data packet therefrom, and sends the data packet to the packet switching network 36. Column C shows the data packets received by the second node system 35 at the latest. Generally, data packets are received ahead of time. Here, we suppose that each data packet sent out by the first node system 31 is received by the second node system 35 in one second, (the maximum packet cross-network delay is one second).

Column D shows that after receiving the first data packet, the second node system 35 delays for one second before sending the reconstructed image data (block 1) therefrom to the destination facsimile machine 22. In this case, when the second node system 35 sends whatever image data (block 1 to block 7) to the destination facsimile machine 22 in order, the second node system 35 must have received the data packet that includes the image data. If we delay for a certain period of time, such as one second, before sending the first part of the image data to the destination facsimile machine, the second node system does not need to insert the fill codes into image data in the following transmission. (Compare columns D and C).

Column E shows that after receiving the first data packet, the second node system 35 sends the image data (block 1) to the destination facsimile machine 22 at once, and transmits the fill codes, if necessary, as described in FIG. 4. In this case, if the transmission time of the fill codes adds up to one second, we do not need to insert fill codes in the subsequent image data transmission, and the entire image data delay is limited. According to CCITT Group 3 standard, a total coded scan line may be transmitted for three seconds, and generally the data bits of the total coded scan line are transmitted in a short time such as less than 100 ms, so there remains more than 2.5 seconds during which time it is possible to insert fill codes. So, generally, we can transmit image data at the buffer until the last total coded scan line, then if necessary we insert the fill codes into the last total coded scan line.

Column F shows the best case scenario, where the second node system 35 receives the data packets as soon as the data packets are sent out by the first node system 31. When the source facsimile machine 12 finishes transmitting the image data (block 7), the destination facsimile machine 22 receives the image data with one second delay.

Column G shows the worst case scenario, where the second node system 35 receives the first data packet at the latest (i.e., one second delay). Then the second node system 35 waits for another one second before sending the image data (block 1) to the destination facsimile machine 22. In which, after the source facsimile machine 12 finishes transmitting the image data (block 7), the destination facsimile machine 22 receives the image data (block 7) with a three-second delay.

A comparison of columns F and G illustrates that the image data delay through the network 10 is between 1 and 3 seconds. In fact, the delay is mainly determined by the packet size, such as a packet including 0.1 second or 1 second image data, and the transmission time of the packet in the packet switching network. The image data delay of the present invention typically ranges between hundreds of milliseconds to a few of seconds.

In the above embodiment, a packet switching network 36 is employed to transmit data packets. However, alternative transmission channels, could be used instead. For instance, a long distance regular telephone circuit (0.3–3.4 kHz) is used as a dedicated transmission channel for connecting the two node systems 31 and 35, and a full duplex 19200 bps modem is used as the packet switching interface in the node systems 31, 35. The original image data from the facsimile machine is compressed to half size of its original, by the compressor 62 of the node systems 31, 35. Group 3 facsimile machines 12, 14, 20, 22 transmit and receive image data with 9600 bps speed, with the transmission time of the image data being 80% of the total communication time of the facsimile machines. Consequently, we obtain the result shown by the following equation:

$$2(duplex) \times 19200 bps \times 2(compressed)/9600 pbs/80\% = 10$$

In other words, ten (10) source and ten (10) destination facsimile machines can communicate with each other, in a similar way to the convention point-to-point communications method over the long distance regular telephone circuit, where only one source and one destination facsimile machines can communicate with each other.

The transmission capacity of a conventional telephone line is not constant. In a regular telephone line (0.3–3.4 kHz), with 2400, 9600 or 19200 bps (bits per second) modem, the capacity is 2400, 9600 or 19200 bps, respectively. With full duplex modems, the data can be transmitted in two directions at the same time. The regular telephone line can support full duplex modems. If the original data were compressed, the amount of original data sent on the line increases.

In the present example, we use full duplex 19200 bps modems, so the regular telephone line can transmit data at 2*19200=38400 bps. The original data is compressed to half its size, the telephone line can transmit original data at 2*38400=76800 bps. If the Group 3 facsimile machines transmit original data at 9600 bps, the line can have the capacity to transmit original data from 76800/9600=8 facsimile machines. The Group 3 facsimile machine transmits other messages generally at 300 bps besides the image data, considering the discount as 20%, the regular telephone line, in the present invention, at the same time, can transmit data from 8/(1−0.20)=10 facsimile machines.

In the conventional point-to-point long distance facsimile communication, the transmission speed of the image data is determined by the quality of the transmission line from the source facsimile machine, i.e., 12, to the local PTSN 27, the communications line from the local PTSN 27 to another local PTSN 30, and therefrom to the destination facsimile machine 22. In the point to point facsimile communication of the present invention, in the network 10 the transmission speed of the source facsimile machine 12 is determined only by the local PTSN 27, and so is the transmission speed of the destination facsimile machine 22. The transmission speed of the image data in the source and destination facsimile machines tends to be faster than in the point-to-point facsimile communications. So it is possible for subscriber to take less transmission time to complete the transmission of the image data in the network 10 by the point to point operation method of present invention than in the convention point to point facsimile communications.

If a poor quality transmission line results in a slower transmission speed, it takes a user a longer time to occupy a long distance telephone line for communication in conventional point-to-point communication. However, in the network 10 of present invention, the subscriber-takes more time to occupy only in a local telephone line. In long distance line, the subscriber transmits constant data bits which are determined by the size of the image only, and the transmission time of the data bits in the distance line is not changed by the transmission speed in the local line, whether it is 9600 or 4800 bps. In this case, the line can be further used to transmit packets from other facsimile communication, such as another 4800 bps facsimile communication can be added into the line, and the line further transmits data packets from the facsimile communication.

Figure 6:
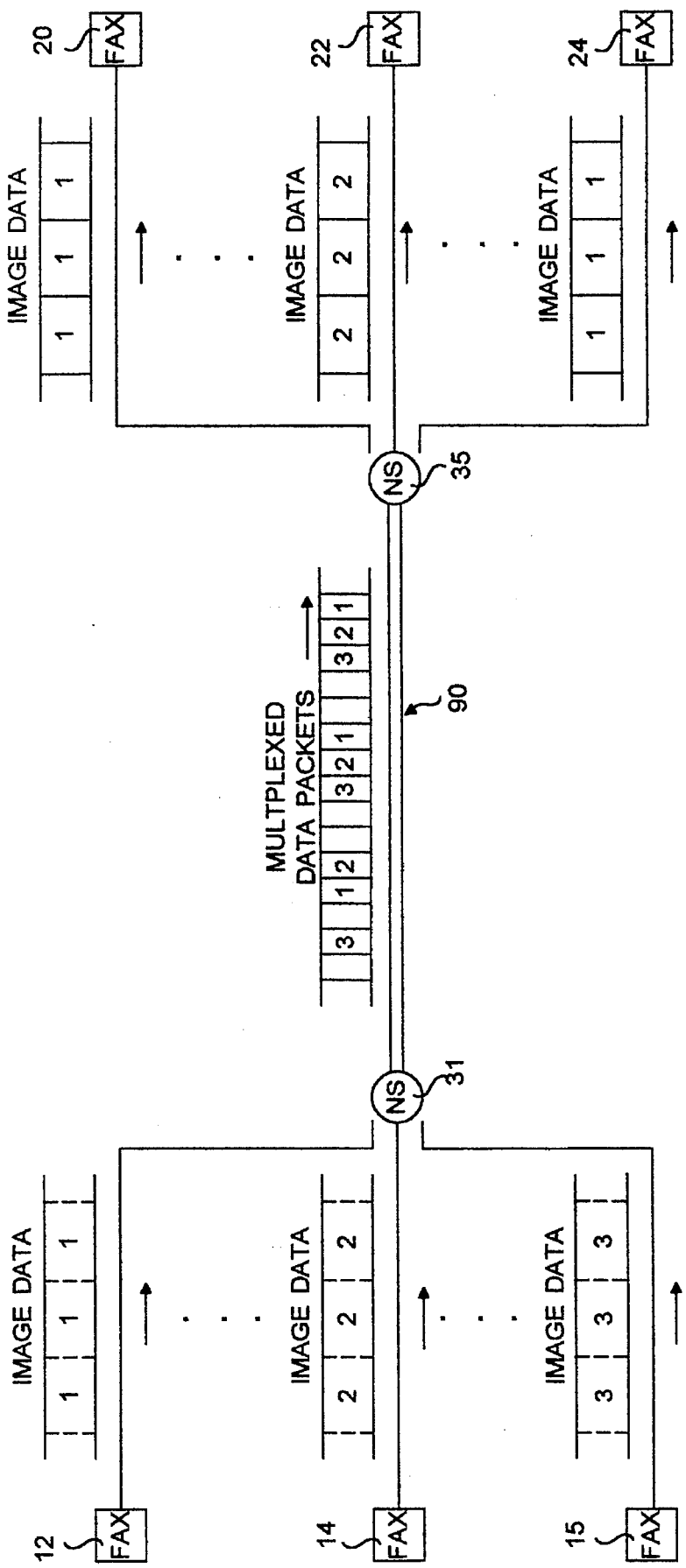
FIG. 6 is a diagram illustrating the general operation of the communication method between a plurality of source facsimile stations and a plurality of destination facsimile stations, using the facsimile communications network of FIG. 1.

FIG. 6 illustrates the general operation of the communication method between a plurality of facsimile machines, using the facsimile communications network 10. At the first node system 31, the image data received from a plurality of facsimile machines 12, 14, 15 are divided into data packets, as illustrated by the numerals 1, 2, 3. The data packets are multiplexed and transmitted, via a common communication channel or link 90, or the packet switching network 36, to the second node system 35. The image data are then restored from the received data packets and are transmitted to the appropriate destination facsimile machines 20, 22, 24. This ensures that the image data from a plurality of source facsimile machines can be transmitted to the appropriate destination facsimile machines simultaneously.

Figure 7:
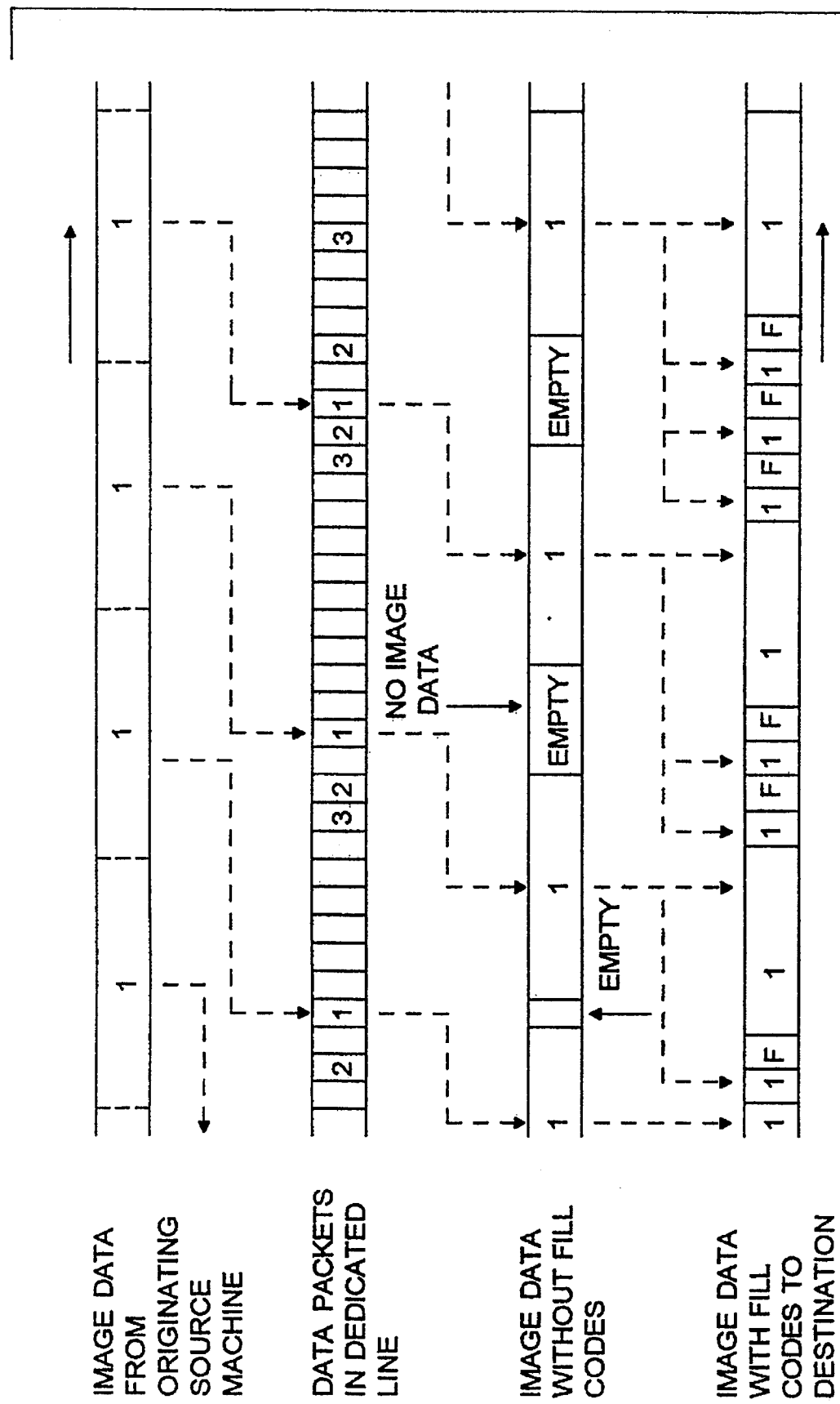
FIG. 7 is a diagram illustrating the use of fill codes to improve the general operation of the facsimile communications network of FIG. 1.

FIG. 7 illustrates the code filling process. Because of queuing and different transmission times of the data packets in the common communication channel 90 or packet switching network 36, it is possible that the image data restored from the received data packets is sent out to the destination facsimile machines; however, the next data packets are not yet received. This may cause an interim interruption of the image data transmission to the destination facsimile machines, which may possibly lead to an interruption in the communication. This problem can be avoided by inserting fill codes (F) between the image data.

Figure 8:
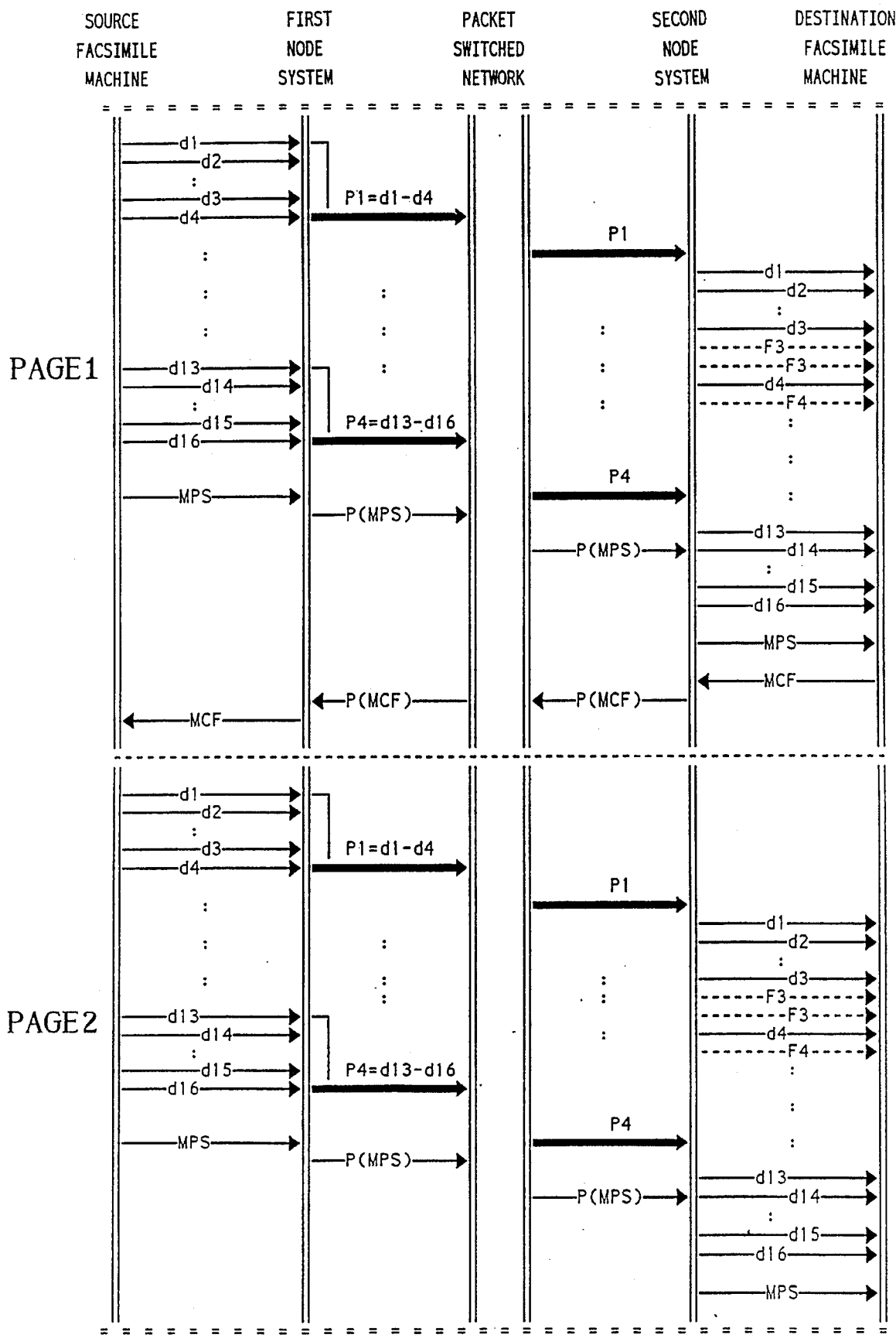
FIG. 8 is an exemplary time diagram and a series of protocols illustrating an image data communication method of multiplex pages between a source facsimile station and a destination facsimile station, via the facsimile communications network of FIG. 1.

Referring now to FIG. 8, which represents exemplary time lines, diagrams or protocols for a multiplex pages image data communication method between the source facsimile machine, i.e., 12, and the destination facsimile machine, i.e., 22, using the facsimile communications network 10. In this example, the facsimile machines also operate in accordance with CCITT Group 3 standard. In FIG. 8, Image data of each page is transmitted by the same method shown in FIG. 4b, then the MPS (multiplex page signal) and the P(MPS) packet connects pages. For example, after the source facsimile machine 12 finishes transmitting image data in page 1, the source facsimile machine sends a MPS signal (instead of EOP signal). The first node system 31 receives the MPS, forms a P(MPS) packet and sends it to the second node system 35. Then the second node system 35 generates a MPS signal and sends it to the destination facsimile machine 22. The MPS signal indicates that there is another image data in next page and asks the destination facsimile machine 22 to receive. The destination facsimile machine 22 generally returns a MCF signal and is ready to receive the following image data in page 2.

Figure 9:
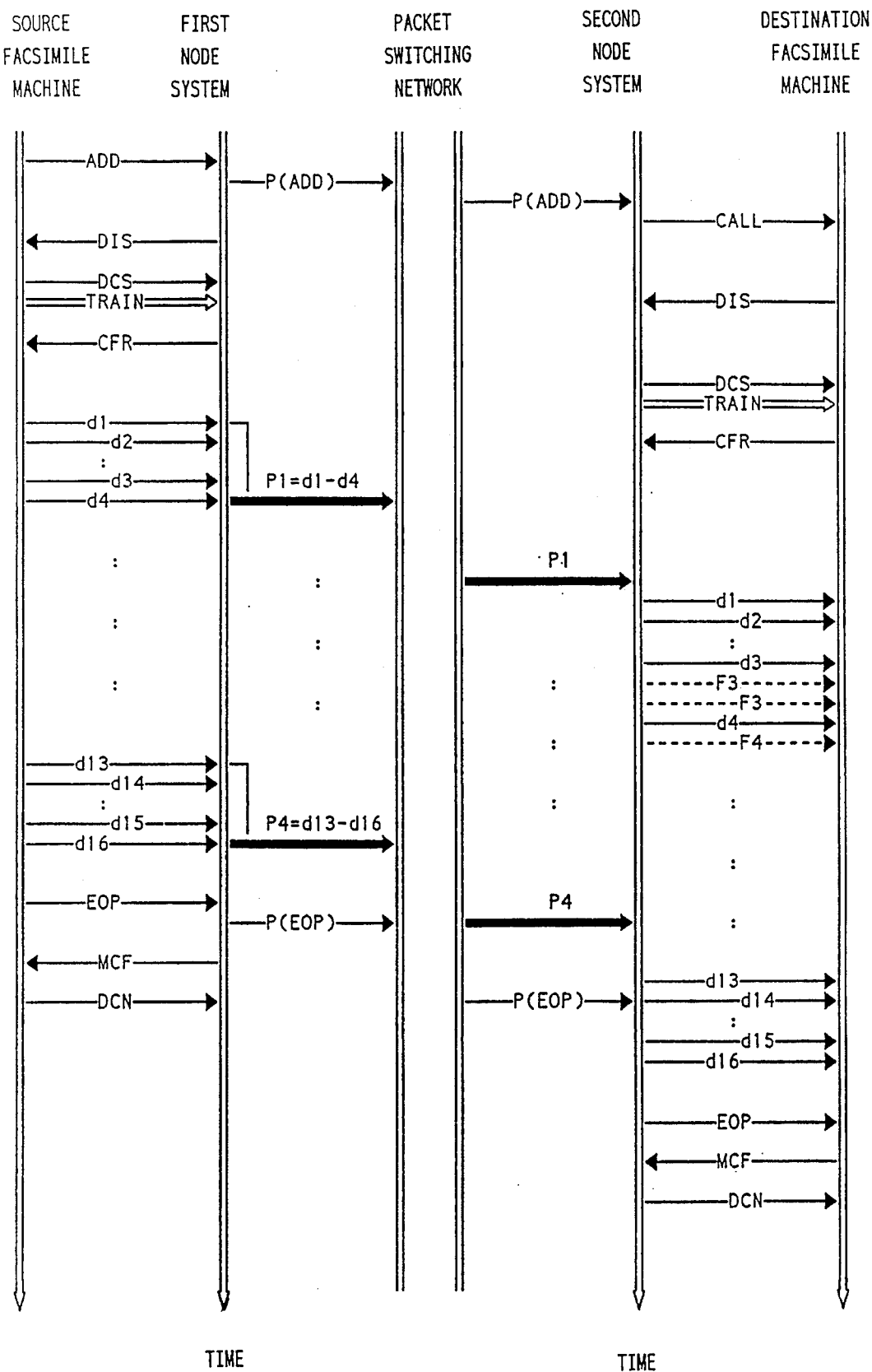
FIG. 9 is exemplary time diagram and a series of protocols, illustrating another communication method between a source facsimile station and a destination facsimile station, via the facsimile communications network of FIG. 1.

Referring now to FIG. 9, which represents exemplary time lines, diagrams or protocols for another communication method between the source facsimile machine, i.e., 12, and the destination facsimile machine, i.e., 22, using the facsimile communications network 10. In this example, the facsimile machines also operate in accordance with CCITT Group 3 standard. In FIG. 9, image data is transmitted by the same method shown in FIG. 4b, but there is some difference in the processing of facsimile communication handshake signals. Here the source and destination facsimile machine's handshake signals ( such as DIS, DCS, DCN, CFR and MCF) are not formed into packets and transmitted via the packet switched network 36. The source facsimile machine 12 and first node system 31 communicate independently, and the first node system 31 generates required facsimile communication signals such as DIS, CFR and MCF); the second node system 35 and the destination facsimile machine 22 communicate independently, and the second node system 35 generates required facsimile signals (such as DCS, and DCN). The packet switched network 36 mainly transmits image data packets.

While particular embodiments of the present invention have been disclosed, it is to be understood that various different modifications are possible and are contemplated within the scope of the specification, drawings, abstract and appended claims.

What is claimed is:

1. A method of transmitting image data from a plurality of source data communication devices to a plurality of destination data communication devices, through a plurality of node systems including a plurality of source and destination node systems, the method comprising the steps of:

a. the plurality of source data communication devices transmitting at least part of the image data to a source node system of the plurality of source node systems;
   b. said source node system processing said part of the image data, and generating data packets therefrom;
   c. said source node system, transmitting said generated data packets to the plurality of destination node systems with minimal delay over at least one transmission channel;
   d. the plurality of destination node systems receiving said data packets, and recovering said at least part of the image data from said data packets;
   e. the plurality of destination node systems selectively inserting fill codes between said converted at least part of the image data; and
   f. the plurality of destination node systems transmitting said converted at least part of the image data and fill codes to the data communication devices with minimal delay;

such that said step of selectively inserting fill codes prevents service interruption between the plurality of source data communication devices and the plurality of destination data communication devices by correcting a temporary inability to receive additional data, and by maintaining real time communication between the plurality of source data communication devices and destination data communication devices.

2. The method according to claim 1, wherein said step of processing includes generating one data packet at a time, and repeating steps b and c for each generated data packet; and wherein said step of receiving includes the following sub-steps:
   (I) the plurality of destination node systems converting said at least part of the image data from said one data packet;
   (ii) the plurality of destination node systems selectively inserting fill codes between said converted at least part of the image data; and
   (iii) the plurality of destination node systems simultaneously transmitting said converted at least part of the image data and fill codes to said at least some of the plurality of destination data communication devices.

3. The method according to claim 1, wherein some of the plurality of source and destination data communication devices include facsimile stations; and further including the step of having said at least some of the plurality of destination facsimile stations delete said fill codes.

4. The method according to claim 3, wherein said facsimile stations operate in accordance with the CCITT Group 3 standard.

5. The method according to claim 4, wherein said fill codes are fill codes according to the CCITT Group 3 standard, and wherein said step of inserting includes inserting said fill codes according to the CCITT Group 3 standard.

6. The method according to claim 3, further including the following steps:

(I) said at least one of the plurality of the source facsimile stations transmits at least a facsimile communication signal to the source node system;
   (ii) the source node system processes said facsimile communication signal, and selects one of the following two alternatives:
     a) transmits a corresponding facsimile communication signal to said at least one of the plurality of the source facsimile stations;
     b) forms a packet which includes the processed data of said facsimile communication signal to at least one destination node system;
   (iii) said at least one destination node system selectively generates a facsimile communication signal from said packet and sends said generated communication signal to said at least some of the plurality of destination facsimile stations;
   (iv) the destination facsimile station transmits at least said facsimile communication signal to said at least one destination node system;
   (v) the destination node system processes said facsimile communication signal, and selects one of the following two alternatives:
     a) transmits a corresponding facsimile communication signal to said at least one of the plurality of the destination facsimile stations;
     b) forms a packet which includes the processed data of said facsimile communication signal to said source node system; and said source node system generates a facsimile communication signal from said packet and sends said generated facsimile communication signal to said at least one of the plurality of the source facsimile stations.

7. The method according to claim 2, wherein said step of processing includes the step of compressing said part of the image data.

8. A data communication network including a plurality of source and destination data communication devices and a plurality of source and destination node systems, the network comprising in combination:
   a. a local telephone switching network PTSN for connection to the plurality of source and destination data communication devices;
   b. at least one packet switching network for connection to the source and destination node systems, in order to allow the plurality of source and destination data communication devices to communicate according to the following steps:
      (i). the plurality of source data communication systems transmitting at least part of the image data to a first source node system of the plurality of source node systems;
      (ii) said first source node system processing said part of the image data, and generating data packets therefrom;
      (iii) said first source node system with said processing step, transmitting said generated data packets to the destination node systems with minimal delay;
      (iv) the destination node systems receiving said data packets, and recovering said at least part of the image data from said data packets and selectively inserting fill codes between said converted converted at least part of the image data; and
      (iv) the destination node systems transmitting said converted at least part of the image data and fill codes to the data communication devices with minimal delay;
such that said step of selectively inserting fill codes prevents service interruption between the plurality of source data communication devices and the plurality of destination data communication devices by correcting a temporary inability to receive additional data, and by maintaining real time communication between the plurality of source data communication devices and destination data communication devices.

9. The network according to claim 8, wherein at least some of the data communication devices are facsimile machines; and
   wherein at least one node system includes a plurality of facsimile units adapted to communicate with at least some of the source and destination facsimile machines, via said PTSN.

10. The network according to claim 9, wherein said at least one node system includes a packet communication unit which is connected to at least one of said facsimile units of said at least one node system, and which communicates with the remaining node systems, via said at least one packet switching network.

11. The network according to claim 10, wherein at least one of said facsimile units includes a network control section (NCU) which is connected to said PTSN, via an appropriate communications link; and
   further including a modem for modulating or demodulating image data to be transmitted or received.

12. The network according to claim 9, wherein at least one of said facsimile units includes a packet assembler/disassembler (PAD) which converts the image data received from said at least one facsimile machine into corresponding data packets, and which further converts data packets received from another node system into corresponding image data.

13. The network according to claim 12, wherein said PAD is connected to a packet buffer which acts as a buffer for said data packets; and
   further including a control section which controls the operation of said PAD and said packet buffer.

14. The network according to claim 10, wherein said packet communication unit includes a packet switching interface which controls the connection of the node system to said at least one packet switching network;
   wherein said packet switching interface is connected to a protocol handling section, which provides a communication protocol to said data packets to be sent onto said at least one packet switching network; and
   wherein said at least one node system includes a compress/expand section, which compresses data packets to be transmitted onto said packet switching network, and which expands data packets to be received from said packet switching network.

15. A node system for use in a facsimile network including a plurality of source and destination data communication devices the node system comprising in combination:
   a. means for receiving image data from the plurality of source data communication devices;
   b. means for generating corresponding data packets from said received image data;
   c. means for sending said generated data packets to another node system with minimal delay;
   d. means for receiving data packets from another node system;
   e. means for forming image data from said received data packets;
   f. means for selectively inserting fill codes into said image data so that such selective insertion of said fill codes prevents service interruption between the plurality of source data communication devices and the plurality of destination data communication devices by correcting a temporary inability to receive additional data, and by maintaining real time communication between the plurality of source data communication devices and destination data communication devices; and
   g. means for sending said image data and said fill codes to the plurality of destination data communication devices.

16. The node system according to claim 15, further including means for receiving facsimile communication signals from the plurality of data communication devices;
   means for processing said facsimile communication signal and selecting one of the following two alternatives:
      a) transmitting a corresponding facsimile communication signal to the plurality of data communication device;
      b) forming a data packet which includes the processed data of said facsimile communication signal to another node system for subsequently sending a facsimile communication signal to the plurality of destination data communication devices;
   means for receiving the processed facsimile communication signal data packet from another node system, and selectively generating a facsimile communication signal therefrom, and transmitting said selected facsimile communication signal to the plurality of destination data communication devices.

17. The node system according to claim 16, wherein the plurality of source and destination data communication devices include Group 3 facsimile stations that operate in accordance with the CCITT Group 3 standard;

wherein said fill codes are fill codes according to the CCITT Group 3 standard; and wherein said fill codes are inserted according to the CCITT Group 3 standard.

18. The node system according to claim 15, further including delay means for delaying the transmission for a predetermined period of time before transmitting the part of the image data in a first data packet to at least one of the plurality of destination data communication devices.

19. The node system according to claim 15, further including means for simultaneously transmitting said part of the image data to the plurality of source data communication devices.

20. The node system according to claim 15, wherein the image data is sent to one or more node systems, for subsequent transmission to said at least one of the plurality of destination data communication devices.

21. The method according to claim 7, wherein said step of receiving includes the step of expanding said part of the image data that has been compressed.

22. The method according to claim 1, further including the step of delaying the transmission of said at least part of the image data in a first data packet to the plurality of destination data communication devices for a predetermined period of time.

23. The method according to claim 1, wherein step (c) includes the step of delaying the transmission of said at least part of the image data in a first data packet, to said destination node system, for a predetermined period of time.

24. The method according to claim 1, wherein step (f) includes the step of delaying the transmission of said at least part of the image data in a first data packet, to at least one of the plurality of destination data communication device for a predetermined period of time.

25. The facsimile network according to claim 8, wherein the communication between the source and destination data communication devices further includes the step of delaying the transmission of a first data packet, to a second node system, for a predetermined period of time.

26. A method of transmitting image data in a facsimile network including a plurality of source facsimile stations, a plurality of destination facsimile stations, a plurality of node systems for connecting the source and the destination facsimile stations, a plurality of local public telephone switching networks (PTSN's) for connecting to the source and destination facsimile stations over at least one transmission channel that connects the node systems, the method comprising the steps of:

a. one or more of said plurality of source facsimile stations transmitting the image data to a source node system of the plurality of node systems;

b. said source node system processing said part of the image data, and generating data packets therefrom;

c. said source node system transmitting said generated data packets to a plurality of successive node systems along a plurality of different routes intermediate said source and destination node systems, with minimal delay;

d. said destination node system receiving said data packets, and reconstructing the image data from said data packets and selectively inserting fill codes to prevent service interruption between the plurality of source and destination facsimile machines by correcting a temporary inability to receive additional data, and by maintaining real time communication between the plurality of source and destination facsimile machines; and e. said destination node system transmitting said reconstructed image data to one or more of said plurality of destination facsimile stations.

27. The method according to claim 26, further including the step of delaying the transmission of said at least part of the image data to said at least one of said plurality of destination facsimile stations, for a predetermined period of time.

28. The method according to claim 26, wherein step (c) includes the step of delaying the transmission of said at least part of the image data in a first data packet, to said destination node system, for a predetermined period of time.

29. The method according to claim 26, wherein step (e) includes the step of delaying the transmission of said at least part of the image data in a first data packet, to at least one of said plurality of destination facsimile stations, for a predetermined period of time.

30. The network according to claim 8, wherein said at least part of the image data from one source data communication device is sent to two or more node systems, for subsequent transmission to the plurality of destination communication devices.

31. The facsimile network according to claim 8, wherein the communication between the source and destination data communication devices further includes the steps of:

(v) said second node system selectively inserting fill codes between said reconstructed at least part of the image data; and (vi) said second node system transmitting said reconstructed at least part of the image data to the at least one destination facsimile station with minimal delay.

32. The facsimile network according to claim 12, wherein at least one of said facsimile units further includes a buffer which temporarily stores said data packets, at least part of the image data, or said data packets and at least part of the image data.

* * * * *